July 31, 1951  S. RUBEN  2,562,215

PRIMARY CELL

Filed June 24, 1943

Patented July 31, 1951

2,562,215

UNITED STATES PATENT OFFICE 2,562,215

PRIMARY CELL

Samuel Ruben, New Rochelle, N. Y.

Application June 24, 1943, Serial No. 492,050

8 Claims. (Cl. 136—107)

This invention relates to electric primary cells.

An object of the invention is to improve primary cells and primary cell structures.

Other objects of the invention will be apparent from the description and claims.

In the drawings:

Figure 5 shows a porous separator for use in the cell of Figure 4.

The present invention is particularly applicable to primary cells of the type wherein the electrodes are of zinc and a depolarizing oxide such as cupric oxide and the electrolyte is an alkali. A feature of the present invention resides in the use of an inert microscopically porous barrier between the depolarizing oxide electrode and the other cell elements. Such a barrier may comprise a hard layer of inert material having microscopic random porosity, such as porous ceramic. The porous layer is chemically and electro-chemically inactive and insoluble in the electrolyte and is preferably inert to both the electrolyte and the depolarizer. Such ceramic materials as pressed and fired refractory oxides and silicates are the preferred materials. However, other materials such as certain carbides, for instance silicon carbide, carbon itself in the form of pressed gas black or graphite, or even certain metals such as pressed iron or nickel powders, can be used. Carbon and the porous metal barriers may be inert in the cell due to the formation of a polarized layer when in contact with the cathode. I have used such materials for the barrier and they appear to be entirely inert to the electrolyte and the depolarizer during operation and shelf life of the cell and for certain applications may be preferable to the ceramic barrier.

Primary cells using cupric oxide as a depolarizer have heretofore tended to deteriorate at elevated temperatures during operation and shelf life due to migration of copper or copper compounds to the zinc electrode where the compounds are reduced to copper and deposited on the zinc producing local battery action with consequent dissolution of the zinc. While this action proceeds rather slowly at room temperature or below, it is greatly accelerated at elevated temperatures resulting in rapid deterioration of the cell at temperatures such as 130° F. encountered in warm climates or in certain industrial installations.

Such separating layers as paper or cellulosic materials do not entirely eliminate the problem, perhaps due to their swelling and also to the tendency of such materials to be attacked by the alkaline electrolyte and the depolarizer.

By using a porous partition or barrier of inert microscopically porous material against the cupric oxide electrode, dissolution of copper and migration to the zinc electrode is prevented. Whether this is due entirely to reduced circulation or is also due to a diaphragm action I can not say. However, the partition does not prevent the alkaline electrolyte from penetrating to the cupric oxide nor does it prevent electrochemical reduction of the cupric oxide while the cell is being operated. Ionic conduction through the porous barrier is therefore permitted.

Figure 1:
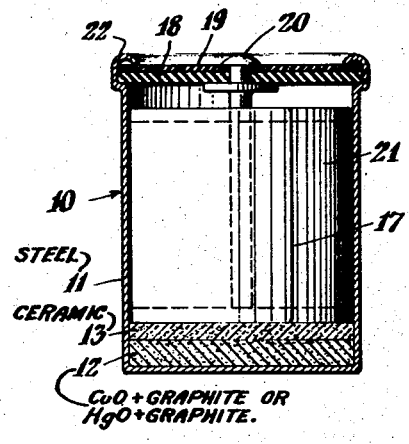
Figure 1 is a longitudinal section of a primary cell embodying features of the present invention.

Referring to the drawings, Figure 1 shows a preferred construction for a primary cell 10. The cell comprises an iron or steel can 11 having a layer 12 of cupric oxide depolarizer composition pressed into its bottom. Porous ceramic disc 13 is pressed into the cam directly on top of the oxide layer and in contact therewith.

Figure 2:
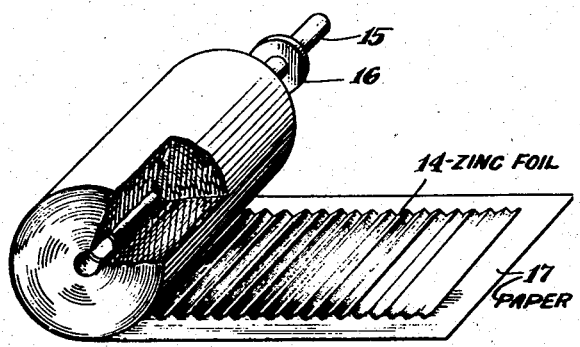
Figure 2 is a perspective view illustrating a method of making an electrode assembly therefor.

The zinc electrode assembly is made as shown in Figure 2 by welding one end of a strip of corrugated zinc foil 14 to a zinc rod 15 having a flange 16 near one end. The corrugated foil is then wound around the rod 15 with an interposed sheet of porous paper 17 to space adjacent turns of the foil. The paper strip 17 projects beyond both edges of the foil and beyond its free end so that when the roll is completed the foil is protected by the paper at its ends and on the outer circumference. The projecting end of rod 15 is inserted in a hole in the middle of a circular disc 18 of synthetic resin such as polystyrene and a second disc 19 of neoprene or other rubber-like material is placed on top of the synthetic resin disc after which the end of rod 15 is spun over to produce a rounded terminal 20 for the zinc electrode.

The electrode assembly is then impregnated with the alkaline electrolyte by immersing the winding in the electrolyte with application of vacuum and pressure to obtain complete impregnation. Can 11 is also filled with electrolyte and is vacuum treated to expel air in the pores and then the electrolyte is poured out and the impregnated zinc electrode roll 21 is inserted, after which the edge 22 of the can is spun over against the neoprene disc 19 to hermetically seal the cell.

The lower end of paper layer 17 in roll 21 presses against the top surface of porous ceramic disc 13 which itself is impregnated with electrolyte so that a continuous electrolyte path extends from the zinc to the cupric oxide.

The preferred depolarizer is a mixture of CuO and graphite. It may be formed by milling together a mixture of finely divided cupric oxide with 8% of graphite of extremely small particle size, such as 5 to 9 microns (for instance, Dixon's micronized graphite). The mixture of graphite with the oxide maintains the conductivity of the composition. While 8% graphite is preferred the proportions can be varied considerably, for example, 2 to 20% graphite can be used.

Where cost is not a controlling factor a cell of higher potential can be obtained by substituting mercuric oxide for the cupric oxide in the depolarized composition.

The preferred ceramic disc barrier is formed of aluminum oxide as follows:

Fine aluminum oxide powder is pressed into a disc at 5,000 pounds per square inch, baked, and then fired at 1,100° C. The finished disc may preferably be $\frac{1}{32}$ inch thick.

The electrolyte may be a solution of sodium, potassium or lithium hydroxide but the preferred electrolyte is the one described in my Patent No. 2,422,045, dated June 10, 1947, which comprises potassium, sodium or lithium hydroxide solution saturated with zinc oxide in the form of alkali metal zincate. With a saturated zincate electrolyte of this type a layer of zinc oxide begins to form on the zinc electrode as soon as the cell is put into service. It is, therefore, necessary with this electrolyte to provide a large area of zinc in order to avoid rapid polarization of the cell during use, preferably at least 2.5 sq. in. for each gram of depolarizer. With the zinc electrode assembly construction illustrated the area of the zinc can be made sufficient to deliver adequate current until the depolarizer is entirely consumed. The zinc can also be amalgamated by dusting the contacting paper 17 with mercuric oxide before winding in order to reduce any local action.

Figure 3:
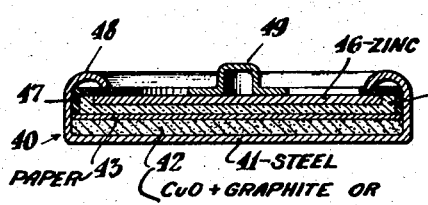
Figure 3 is a perspective view of a modified electrode construction.

Figure 3 illustrates a modified form of zinc electrode 30 which comprises a die cast zinc member having a finned electrode portion 31 and a terminal rod 32. With this electrode the cell is filled with liquid or gelatinous electrolyte.

Figure 4:
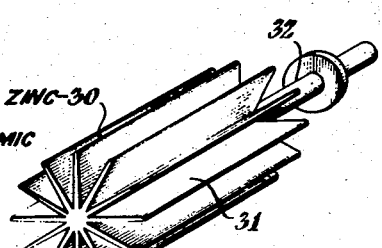
Figure 4 is a section through a modified primary cell of wafer construction.

Figure 4 shows a wafer type primary cell 40 comprising a shallow steel cup 41 having a depolarizing layer 42 pressed into the bottom thereof, a layer of paper 43 laid over the depolarizing layer and a porous ceramic disc 44 placed over the paper. As shown in Figure 5 the porous disc 44 has a flat annular central recess 45 therein in which a zinc electrode disc 46 is placed.

Prior to assembly the paper 43 and ceramic disc 44 are both impregnated with the alkaline electrolyte and then placed in the steel cup. The zinc electrode is placed in the recess 45 and a ring 47 of neoprene is placed over the assembly so as to cover the edges of the zinc electrode and the ceramic disc after which the edge 48 of cup 41 is spun over the neoprene ring to seal the cell. Zinc disc 46 may be provided with a central welded boss 49 to serve as a terminal.

By placing the depolarizer electrode at the bottom of the cell and covering it with the porous barrier layer, copper salt solutions, being of higher density will, if formed, tend to remain under the barrier. However, the porous ceramic appears to prevent migration of copper compounds regardless of the position in which the cell is placed.

While specific embodiments of the invention have been described, it is intended to cover the invention broadly within the spirit and scope of the appended claims.

What is claimed is:

1. An alkaline dry cell structure comprising a metal cup having a depolarizing oxide cathode composition compressed in the bottom thereof, an inert rigid barrier disc having a microscopic random porosity tightly fitted within said cup over said oxide, an anode in said cup formed of a roll of metal foil and a porous sheet spacer enrolled therewith and separating the turns thereof with the sheet spacer extending from the lower end of said roll into contact with said barrier disc, and an alkaline electrolyte in said sheet spacer and said barrier disc and in contact with said electrodes.

2. An alkaline dry cell structure comprising a steel cup having a depolarizing cathode layer formed of mixed cupric oxide and graphite powders compressed into the bottom thereof, a microporous ceramic barrier disc tightly fitted within said cup over said oxide, an anode in said cup formed of zinc foil strip wound into a roll with a porous paper spacer enrolled therewith and separating the turns thereof, with the paper spacer extending from the lower end of said roll into contact with said barrier disc, and an alkali electrolyte solution absorbed in said paper and porous ceramic and in contact with said anode and cathode.

3. An alkaline dry cell structure comprising a steel cup having a depolarizing cathode layer formed of mixed cupric oxide and graphite powders compressed into the bottom thereof, a microporous ceramic barrier disc tightly fitted within said cup over said oxide, an anode in said cup formed of zinc foil strip wound into a roll with a porous paper spacer enrolled therewith and separating the turns thereof, with the paper spacer extending from the lower end of said roll into contact with said barrier disc, and an alkali electrolyte solution absorbed in said paper and porous ceramic and in contact with said anode and cathode, an insulating top sealed into the top of said cup and a terminal for said zinc electrode extending therethrough.

4. An alkaline dry cell comprising in combination, a metal cup, an oxygen-yielding depolarizer cathode composition compressed in the bottom of said cup, an inert rigid barrier disc having microscopic random porosity within said cup and extending over the exposed face of said cathode composition, an anode formed of a roll of metal foil and a porous sheet spacer enrolled therewith and separating the turns thereof with the sheet spacer extending from the lower end of said roll into contact with said barrier disc, an alkaline electrolyte in said sheet spacer and in said barrier disc and in contact with said cathode and anode, and a closure member for said cup defining therewith a sealed enclosure for the cell.

5. The alkaline dry cell claimed in claim 4, wherein the inert rigid barrier disc having microscopic random porosity is formed of porous ceramic material.

6. The alkaline dry cell claimed in claim 4, wherein the inert rigid barrier disc having microscopic random porosity is formed of pressed and fired ceramic material selected from the group consisting of refractory oxides and silicates.

7. An alkaline dry cell comprising, in combination, a metal cup, an oxygen-yielding depolarizer cathode composition compressed in the bottom of said cup, said composition comprising mercuric oxide as its major portion, an inert rigid barrier disc having microscopic random porosity within said cup and extending over and in contact with the exposed face of said cathode composition, an anode formed of a roll of metal foil and a porous sheet spacer enrolled therewith and separating the turns thereof with the sheet spacer extending from the lower end of said roll into contact with said barrier disc, an alkaline electrolyte absorbed in said sheet spacer and in said barrier disc and in contact with said cathode and anode, and a closure member for said cup defining therewith a sealed enclosure for the cell.

8. An alkaline dry cell comprising, in combination, a metal cup, an oxygen-yielding depolarizer cathode composition compressed in the bottom of said cup, said composition comprising mercuric oxide as its major portion, an inert rigid barrier disc having microscopic random porosity extending over and in contact with the exposed face of said cathode composition, an anode formed of a roll of metal foil and a porous paper spacer enrolled therewith and separating the turns thereof with an edge of the paper spacer extending from the lower end of said roll into contact with said barrier disc, at least the surface of said metal foil being constituted of amalgamated zinc, an alkaline electrolyte absorbed in said sheet spacer and in said barrier disc and in contact with said cathode and anode and a closure member for said cup defining therewith a sealed enclosure for the cell.

SAMUEL RUBEN.

REFERENCES CITED

The following references are of record in the file of this patent:

UNITED STATES PATENTS

| Number | Name | Date |
|---|---|---|
| Re. 22,065 | Young | Apr. 7, 1942 |
| 274,110 | La Lande et al. | Mar. 20, 1883 |
| 298,175 | Clarke | May 6, 1884 |
| 512,473 | Irving | Jan. 9, 1894 |
| 543,372 | Boettcher | July 23, 1895 |
| 718,076 | Begeman | Jan. 18, 1903 |
| 757,355 | Schoenmehl | Apr. 12, 1904 |
| 1,015,735 | Heuser | Jan. 23, 1912 |
| 1,137,226 | Manchester | Apr. 27, 1915 |
| 1,174,798 | Apple | Mar. 7, 1916 |
| 1,200,345 | Hardy et al. | Oct. 3, 1916 |
| 1,276,604 | Wilson | Aug. 20, 1918 |
| 1,291,253 | Thatcher | Jan. 14, 1919 |
| 1,458,377 | Anderson | June 12, 1923 |
| 1,786,328 | Benner et al. | Dec. 23, 1930 |
| 2,257,129 | Ruben | Sept. 30, 1941 |
| 2,422,045 | Ruben | June 10, 1947 |
| 2,422,046 | Ruben | June 10, 1947 |